UNITED STATES PATENT OFFICE.

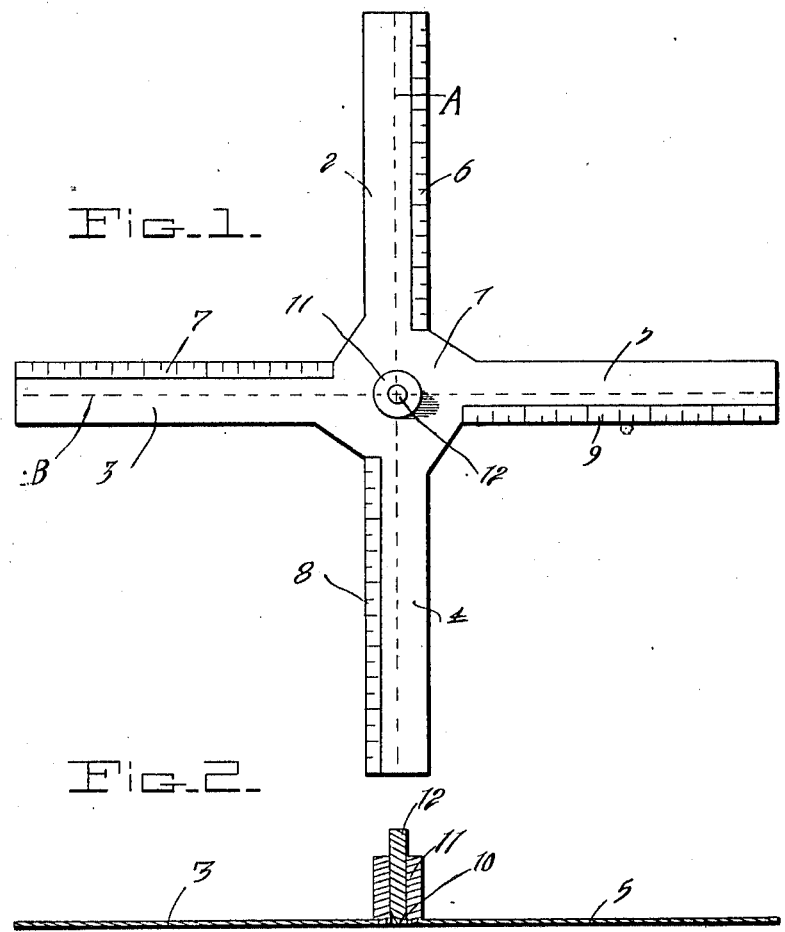

SIDNEY T. DERBYSHIRE, OF BELOIT, WISCONSIN.

MEASURING INSTRUMENT.

974,364.

Specification of Letters Patent.   Patented Nov. 1, 1910.

Application filed October 12, 1909.   Serial No. 522,233.

*To all whom it may concern:*

Be it known that I, SIDNEY T. DERBYSHIRE, a citizen of the United States, residing at Beloit, in the county of Rock, State of Wisconsin, have invented certain new and useful Improvements in Measuring Instruments; and I do hereby declare the following to be a full, clear, and exact description of the invention, such as will enable others skilled in the art to which it appertains to make and use the same.

This invention relates to measuring instruments.

The object of the invention is to provide a simple and inexpensive instrument that will be found useful to carpenters, machinists and others in quickly and accurately determining the center of a circle, square or other geometrical figure; in measuring distances and in plotting work generally.

A further object of the invention is to provide such an instrument with means adapted to be utilized, after a center has been ascertained, to punch the point of said center upon the surface of the material being measured.

With the above and other objects in view the invention consists in the details of construction and in the arrangement and combination of parts to be hereinafter more fully described and set forth in the claim.

In describing the invention in detail reference will be had to the accompanying drawings in which like characters of reference denote corresponding parts in the several views, and in which, Figure 1 is a plan view showing an instrument of the character named constructed in accordance with the invention; and Fig. 2, a sectional view of the common longitudinal axis of two oppositely disposed arms of the instrument.

Referring to the drawings the instrument is illustrated as formed of a central portion 1 provided with the laterally extending arms 2, 3, 4 and 5. The disposition of said arms is such that they are arranged in alining pairs, each pair having a common longitudinal axis and the common longitudinal axes of each pair intersect each other at right angles, said common longitudinal axis of the arms 2 and 4 being indicated in the drawing by the dotted line A, while the common axis of the arms 3 and 5 is indicated by the dotted line B. The longitudinal edge of each of said arms 2, 3, 4, and 5 is parallel to the longitudinal axis of its respective arm. The corresponding portions 6, 7, 8, and 9 of the top face of said arms are similarly scaled in any desired measure, so that the scaled portions of oppositely disposed arms will be located on opposite sides of the common longitudinal axis thereof. Formed transversely through the center portion 1 of the instrument is an aperture 10, the vertical axis of said aperture passing through the point of intersection of the axes A and B. A sleeve 11 is secured on the upper face of the center portion of the instrument in any suitable manner the bore of said sleeve corresponding in diameter to the diameter of the aperture 10 and being in registration with said aperture. Mounted for a sliding movement in said sleeve and aperture is a prick-punch 12, the point 13 of said prick-punch is disposed in the common vertical axis of the aperture 10 and the bore of the sleeve 11.

The manner of using the instrument will be obvious. When it is desired to ascertain the center of a given object it is only necessary to place the instrument thereon and adjust same until the limitations of the object intersect corresponding distances on the scale of oppositely disposed arms and when this condition exists strike the prick-punch 12 a slight blow and the point of center will be indented on the surface of the object.

While the instrument has been shown with a prick-punch mounted thereon it will be equally obvious that same may be dispensed with and the point of center accurately marked with a suitable instrument by insertion through the aperture 10.

While one preferred form of the invention is shown and described it will be noted that various changes in the details thereof may be resorted to without in any manner departing from the spirit and scope of the invention.

What is claimed is:—

A measuring instrument comprising a central portion, a plurality of correspondingly scaled arms radiating from said central portion and located in a common plane therewith, the longitudinal axes of said arms intersecting each other at a common point, said central portion being provided with an aperture passing through the point of intersection of the longitudinal axes of said arms, a tubular sleeve secured upon said central portion with its bore in registration with said aperture and a prick punch mounted for sliding movement through the bore of said sleeve and said aperture.

In testimony whereof, I affix my signature, in presence of two witnesses.

SIDNEY T. DERBYSHIRE.

Witnesses:
F. F. LIVERMORE,
MARY C. WHELAN.